(12) United States Patent
Mazumdar et al.

(10) Patent No.: US 9,035,005 B2
(45) Date of Patent: May 19, 2015

(54) FUNCTIONALIZED ELASTOMER (71) Applicant: The Goodyear Tire & Rubber Company, Akron, OH (US)

(72) Inventors: Arindam Mazumdar, Stow, OH (US); Frank James Feher, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 35 days.

(21) Appl. No.: 13/894,790

(22) Filed: May 15, 2013

(65) Prior Publication Data

US 2014/0343231 A1 Nov. 20, 2014

(51) Int. Cl.
*C08L 51/04* (2006.01)
*C08F 8/00* (2006.01)
*C08L 9/00* (2006.01)
*C08F 36/08* (2006.01)

(52) U.S. Cl.
CPC ..................................... *C08F 36/08* (2013.01)

(58) Field of Classification Search
CPC ............................... C08L 51/04; C08F 220/56
USPC .......... 526/266, 296; 525/192, 218, 233, 266, 525/296
See application file for complete search history.

(56) References Cited

U.S. PATENT DOCUMENTS

| | | | |
|---|---|---|---|
| 4,034,000 A | 7/1977 | Schoenberg | |
| 5,391,637 A | 2/1995 | Willis et al. | |
| 5,391,663 A | 2/1995 | Bening et al. | |
| 6,579,949 B1 | 6/2003 | Hergenrother et al. | |
| 6,864,321 B2 | 3/2005 | Chao et al. | |
| 8,172,873 B2 | 5/2012 | Anthamatten et al. | |
| 8,217,103 B2 | 7/2012 | Thiele et al. | |
| 8,415,432 B1 | 4/2013 | Mruk et al. | |
| 8,536,266 B2 * | 9/2013 | Mruk et al. | 524/555 |
| 2013/0165579 A1 | 6/2013 | Mruk et al. | |
| 2013/0165587 A1 | 6/2013 | Mruk et al. | |
| 2013/0165588 A1 | 6/2013 | Mruk et al. | |
| 2013/0165589 A1 | 6/2013 | Mruk et al. | |

FOREIGN PATENT DOCUMENTS

| | | |
|---|---|---|
| EP | 2735451 A1 | 5/2014 |
| JP | 2001123018 A | 5/2001 |
| JP | 2011184511 A | 9/2011 |

OTHER PUBLICATIONS

JP2011184511 English Translation.
Miyagi et al, WO2012/008298 English Translation, WO2012/008298, Jan. 19, 2012, WO2012008298, WIPO.
Pounder et al, Metal free thiol-maleimide "Click" reaction as a mild functionalisation strategy for degradable polymers, Chem. Commun., Sep. 29, 2008, 5158-5160, 2008, Royal Society of Chemistry, GB.
Tohyama et al, Synthesis of end-functionalized polymer by means of living anionic polymerization, Macromol. Chem. Phys., 1996, 3135-3148, 197.

* cited by examiner

*Primary Examiner* — Nathan M Nutter
(74) *Attorney, Agent, or Firm* — John D. DeLong (57) ABSTRACT

The present invention is directed to a copolymer comprising: a polymeric backbone chain derived from a monomer comprising at least one conjugated diolefin monomer and optionally at least one vinyl aromatic monomer; and a polymeric side-chain bonded exclusively to a terminal end of the backbone chain, the side-chain comprising a polymer derived from a monomer having a hydrogen bond donor moiety and a hydrogen bond acceptor moiety.

9 Claims, 2 Drawing Sheets t = 0 hr        t = 15 hr

FUNCTIONALIZED ELASTOMER

BACKGROUND

Polyisoprene is a key material for producing a broad range of consumer and industrial products. The two most common forms for polyisoprene are "natural rubber" and "synthetic polyisoprene". Natural rubber typically is derived from latex produced by *Hevea brasiliensis* (i.e., the common rubber tree), although a broad range of other plants (e.g., guayule and *Taraxacum kok-Saghyz* (aka Russian dandelion)) also are known to produce stoichiometrically similar, rubber-like materials. Unlike natural rubber, which is only formally derived from polymerization of isoprene, synthetic polyisoprene is actually produced by large-scale, industrial polymerization of isoprene monomer.

The structures of synthetic polyisoprene (PI) and natural rubber (NR) are similar enough to allow for free substitution of either rubber in many applications, but there are important differences. For example, rubber produced by the rubber tree has a high molecular weight and a tendency to crystallize more completely and faster than commercially available synthetic PI. The high molecular weight is desirable for imparting "green strength" during tire manufacturing. The rapid strain-crystallization of rubber is believed to be responsible for the excellent wear and tear properties of natural rubber—especially under severe conditions.

Early efforts to develop synthetic PI as a replacement for natural rubber elucidated much of the fundamental technology and allowed commercialization of synthetic PI to be achieved in the 1960's. (see e.g. Schoenberg, et al Rubber Chem Tech. 52, 526-604 (1979)) In general, the following characteristics are believed to be desirable in synthetic PI intended for tire applications: high cis-content (vs trans content); high 1,4-addition (vs 3,4-addition); high head-to-tail content; and high molecular weight.

Subsequent efforts to achieve the highest practical level for each characteristic—especially using Neodymium-based Ziegler/Natta-type catalysts have built upon the early work and led to today's best synthetic replacements for NR. (see e.g. Friebe, et al Adv. Polym. Sci. 204, 1 (2006))

For several decades, it was believed that the differences between natural rubber and synthetic rubber were the result of natural rubber having an almost pure cis-1,4 stereochemistry and branched polymer chain structures. The potential role of non-rubber constituents in natural rubber was largely ignored. It now appears from extensive recent work by Prof. Yasuyuki Tanaka and coworkers that the non-rubber components play an essential role in determining the properties and performance of natural rubber. (see e.g., Tanaka, et al Polymer 41, 7483-8 (2000); Rubber Chem. Tech. 74, 355-75 (2001); Biopolymers 2, 1-25 (2001)) This is particularly true for *Hevea* rubber, which clearly has a structure with nanometer-scale phase domains that can explain many of the property differences between natural rubber and synthetic rubber. In other words, natural rubber is best viewed as a nanostructured elastomer rather than a hydrocarbon polymer with non-hydrocarbon impurities.

SUMMARY

The present invention is directed to a copolymer comprising: a polymeric backbone chain derived from a monomer comprising at least one conjugated diolefin monomer and optionally at least one vinyl aromatic monomer; and a polymeric side-chain bonded exclusively to a terminal end of the backbone chain, the side-chain comprising a polymer derived from a monomer having a hydrogen bond donor moiety and a hydrogen bond acceptor moiety.

DESCRIPTION

There is disclosed a copolymer comprising: a polymeric backbone chain derived from a monomer comprising at least one conjugated diolefin monomer and optionally at least one vinyl aromatic monomer; and a polymeric side-chain bonded exclusively to a terminal end of the backbone chain, the side-chain comprising a polymer derived from a monomer having a hydrogen bond donor moiety and a hydrogen bond acceptor moiety.

In one embodiment, the copolymer has the structure I $$X\text{—}R\text{—}O\text{—}R'\text{—}S\text{—}Z \qquad (I)$$

where X is a polymer derived from a monomer comprising at least one conjugated diolefin monomer and optionally at least one vinyl aromatic monomer;

S is sulfur;

Z is a polymer derived from a monomer having a hydrogen bond donor moiety and a hydrogen bond acceptor moiety;

R is a covalent bond or an alkanediyl group of 1 to 12 carbon atoms bonded to the terminal end of X;

O is oxygen; and

R' is a divalent organic group comprising a maleimido group linked to the S.

Various strategies have been attempted for the synthesis of functionalized polyisoprene (PI) which can show increase in tensile strength by inducing nanostructure formation thereby mimicking natural rubber (NR). One objective is to use polyisoprenic polymers with high cis-content which would enable the strain induced crystallization as observed in NR. Both Ziegler-Natta and anionic polymerization could typically be used to synthesize the precursor to the desired end-functionalized polymer. Anionic approach is the preferred way to synthesize hydroxyl-end-functionalized PI (PI-OH), which served as a precursor for the synthesis of the nanostructured elastomer.

The polymerization employed in making the hydroxyl-end functionalized elastomer is typically initiated by adding an organolithium initiator to an organic polymerization medium that contains the monomers. Such polymerizations can be carried out utilizing continuous or batch polymerization techniques.

Suitable polymerization methods are known in the art, for example as disclosed in U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240; all of which are fully incorporated herein by reference.

The functionalized elastomers usable in accordance with this invention can be made by the homopolymerization of a conjugated diolefin monomer or by the random copolymerization of a conjugated diolefin monomer with a vinyl aromatic monomer. It is, of course, also possible to make living polymers by polymerizing a mixture of conjugated diolefin monomers with one or more ethylenically unsaturated monomers, such as vinyl aromatic monomers. The conjugated diolefin monomers which can be utilized in the synthesis of functionalized elastomer generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Many types of unsaturated monomers which contain carbon-carbon double bonds can be polymerized into polymers using such metal catalysts. Elastomeric or functionalized elastomers can be synthesized by polymerizing diene monomers utilizing this type of metal initiator system. The diene monomers that can be polymerized into synthetic functionalized elastomers can be either conjugated or nonconjugated diolefins. Conjugated diolefin monomers containing from 4 to 8 carbon atoms are generally preferred. Vinyl-substituted aromatic monomers can also be copolymerized with one or more diene monomers into functionalized elastomers, for example styrene-butadiene rubber (SBR). Some representative examples of conjugated diene monomers that can be polymerized into functionalized elastomers include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of functionalized elastomers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene.

Some representative examples of ethylenically unsaturated monomers that can potentially be synthesized into functionalized elastomers usable in accordance with this invention include vinyl aromatics such as styrene, α-methylstyrene, bromostyrene, chlorostyrene, fluorostyrene and the like, alone or in admixture.

Elastomers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

The functionalized elastomers produced in accordance with this invention are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

Some representative examples of functionalized elastomers usable in accordance with this invention include functionalized versions of polyisoprene (IR), polybutadiene (BR), styrene-isoprene-butadiene rubber (SIBR), styrene-isoprene rubber (SIR), isoprene-butadiene rubber (IBR). In cases where the functionalized elastomer is comprised of repeat units that are derived from two or more monomers, the repeat units which are derived from the different monomers will normally be distributed in an essentially random manner.

The initiator used to initiate the polymerization employed in synthesizing the living functionalized elastomer that is functionalized in accordance with this invention is typically selected from the group consisting of barium, lithium, magnesium, sodium, and potassium. Lithium and magnesium are the metals that are most commonly utilized in the synthesis of such metal terminated polymers (living polymers). Normally, lithium initiators are more preferred.

Organolithium compounds are the preferred initiators for utilization in such polymerizations. The organolithium compounds which are utilized as initiators are normally organo monolithium compounds.

In one embodiment, the organolithium compounds which may be used as initiators are commonly known in the art, including alkyl lithium compounds such as n-butyl lithium and the like. In this embodiment, the hydroxyl-end functionalized elastomer is obtained using ethylene oxide termination of the polymerization reaction.

In another embodiment, the organolithium compounds which may be used as initiators are monofunctional compounds which can be represented by the formula (II)

where $R^1$, $R^2$, $R^3$ can all be the same or different and are selected from the group consisting of alkyls having from 1 to 8 carbon atoms, cycloalkyls having from 3 to 11 carbon atoms, or aryls having from 6 to 14 carbon atoms, $R^4$ is an alkylene having from 1 to 8 carbon atoms, a cycloalkylene having from 3 to 11 carbon atoms, or an arylene having from 6 to 14 carbon atoms, X is S, O or NH, and Li is lithium. In this embodiment, formation of a metal terminated living polyisoprene polymer is depicted in Scheme 1, wherein the initiator of formula II is t-butyldimethylsiloxypropyl lithium.

Polymerization using the initiator of formula II results in an end-functionalized elastomer as depicted in Scheme 1. Removal of the substituted silyl group $R^1R^2R^3Si$ (e.g., the t-butyldimethylsilyl group shown encircled in Scheme 1) affords the hydroxy end-functionalized elastomer. Removal of the substituted silyl group may be done, for example, by reaction with acids such as hydrochloric acid, or with fluoride compounds such as tetrabutyl ammonium fluoride (TBAF), or with alkylaluminum reagents such as diisobutylaluminium hydride (DIBAL-H).

The amount of organolithium initiator utilized will vary depending upon the molecular weight which is desired for the functionalized elastomer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The polymerization temperature utilized can vary over a broad range of from about −20° C. to about 180° C. In most cases, a polymerization temperature within the range of about 30° C. to about 125° C. will be utilized. It is typically preferred for the polymerization temperature to be within the range of about 45° C. to about 100° C. It is typically most preferred for the polymerization temperature to be within the range of about 60° C. to about 85° C. The pressure used will normally be sufficient to maintain a substantially liquid phase under the conditions of the polymerization reaction.

The rubber polymers which are prepared by anionic polymerization may be coupled with a suitable coupling agent, such as a tin halide or a silicon halide, to improve desired properties.

The metal terminated living functionalized elastomers utilized in the practice of this invention can be of virtually any molecular weight. However, the number average molecular weight of the living functionalized elastomer will typically be within the range of about 10,000 to about 1,000,000. In one embodiment, the number average molecular weight of the living functionalized elastomer will be within the range of a 50,000 to 500,000. In one embodiment, the living functionalized elastomers have a number average molecular weight within the range of 100,000 to 250,000.

After the polymerization reaction is completed, it will normally be desirable to "kill" any living polydiene chains which remain. Polymerization may be terminated in the usual manner, using an excess of a short chain alcohol such as methanol, ethanol, isopropanol, or the like. The protected end-group functionalized polydiene elastomer can then be recovered from the solution utilizing standard techniques. Deprotection of the protected-end-group functionalized polymer is carried out to produce the hydroxyl-end functionalized polydiene.

The hydroxyl end-functionalized polymer may be converted to a "thiolophile" conducive to reactive in a thiol-ene reaction. In one embodiment, the hydroxyl-end functionalized polymer is reacted with a maleimido acid chloride of formula III where $R^5$ is a linear or branch alkanediyl, cycloalkanediyl, or combination thereof. Formation of a maleimide-terminated polymer through reaction of the hydroxyl end-functionalized elastomer with a maleimido acid chloride is depicted in Scheme 2, where $R^5$ is cyclohexyl and the hydroxyl end-functionalized elastomer is the unprotected form of the elastomer from Scheme 1.

The maleimide-terminated polymer is combined with a thiol-terminated version of the polymer Z to obtain the copolymer.

In one embodiment, the polymer Z derived from a monomer having a hydrogen bond donor moiety and a hydrogen bond acceptor moiety includes homopolymers and copolymers of various monomers, including but not limited to polymers of: acrylamides and substituted acrylamides, methacrylamides and substituted methacrylamides, acrylic acids and substituted acrylic acids, methacrylic acids and substituted methacrylic acids.

The term "hydrogen bond" is used herein in the same manner as would be understood by one of ordinary skill in the art. The terms "hydrogen bond acceptor moiety" and "hydrogen bond donor moiety" are defined herein as moieties that are capable of forming a hydrogen bond when at least one acceptor moiety and at least one donor moiety are present.

In one embodiment, the polymer Z is a polymer of a monomer of formula IV (IV)

where $R^6$ is selected from the group consisting of C2 to C6 linear alkyl, C2 to C6 branched alkyl, and C3 to C6 cycloalkyl.

In one embodiment, Z is of formula (V)

(V)

where $R^7$ is selected from the group consisting of C2 to C6 linear alkyl, C2 to C6 branched alkyl, and C3 to C6 cycloalkyl.

In one embodiment, the polymer Z is a polymer of an N-substituted monoalkyl acrylamide derivative.

In one embodiment, the polymer Z is a polymer of N-isopropylacrylamide.

In one embodiment, the polymer Z has a weight average molecular weight ranging from about 500 to about 20000 g/mol.

In one embodiment, the copolymer comprises from about 1 to about 20 weight percent Z.

The copolymer of formula I may be produced by various methods. In one embodiment, the copolymer may be produced by terminally functionalizing the polymer X with the polymer Z to produce a graft copolymer with an elastomer backbone X and a terminal Z. A convenient way for the functionalization of a variety of elastomers is the thiol-ene reaction during which alkene moiety being present in the maleimide group of the maleimide terminated polymer is transformed into a thioether by reaction with a thiol. In order to allow the functionalization of the elastomers, a thiol-terminated version of the polymer Z is used. The thiol moiety can be introduced by reaction of thiocarbonylthio endgroups with nucleophilic agents. Polymers exhibiting thiocarbonylthio end groups can be produced by reversible addition-fragmentation chain transfer (RAFT) polymerization. One reaction scheme describes the use of PNIPAM as polymer Z, however, this invention is not limited to that as any polymer derived from a monomer having a hydrogen bond donor moiety and a hydrogen bond acceptor moiety, which for example can be produced by RAFT polymerization, can be used for the functionalization of the elastomer.

In one embodiment, the thiol-terminated polymer Z is obtained by polymerizing a monomer having hydrogen bond donor and acceptor moieties in the presence of a thiocarbonylthio RAFT chain transfer agent to form a polymer comprising a terminal thiocarbonylthio group; and cleaving the terminal thiocarbonylthio group to a thiol group to form the polymer Z comprising a terminal thiol group.

In one embodiment, the terminal thiol group of the polymer Z is incorporated in the polymer during polymerization through the mechanism of reversible addition-fragmentation chain transfer (RAFT). More details of the RAFT polymerization mechanism may be found by reference to Moad et al., *Aust. J. Chem.* 2005, 58, 379-410. As is known in the art, RAFT polymerization of free-radical polymerizable monomers is accomplished in the presence of a thiocarbonylthio RAFT chain transfer agent of general formula (VI)

(VI)

where $R^8$ is a free radical leaving group able to reinitiate polymerization, and Q is a functional group that influences the rate of radical addition and fragmentation. Suitable thiocarbonylthio RAFT chain transfer agents include dithioesters, trithiocarbonates, dithiocarbamates, and xanthates. In one embodiment, the thiocarbonylthio chain transfer agent is a trithiocarbonate. In one embodiment, the thiocarbonylthio chain transfer agent is selected from the group consisting of S-1-dodecyl-S-(αα'-dimethyl-α''-acetic acid) trithiocarbonate and 4-cyano-4-dodecylsulfanylthiocarbonylsulfanyl-4-methyl butyric acid.

Upon RAFT polymerization in the presence of a suitable thiocarbonylthio chain transfer agent, the chain-terminated polymer has the general formula (VII)

(VII)

where Z represents the polymer chain derived from monomers having a hydrogen bond donor moiety and a hydrogen bond acceptor moiety.

The chain terminated polymer of formula VI is then reacted with a suitable nucleophile to cleave the C-S linkage to obtain a second polymer of formula (VII) having a terminal thiol group (VIII)

In one embodiment, the chain terminated polymer of formula VII is treated by aminolysis to obtain the thiol-terminated polymer of formula VIII.

The polymer Z having a terminal thiol group may be reacted with the maleimide terminated polymer in a thiol-ene reaction to form the copolymer as illustrated in Scheme 3, where the polymer Z is shown as PNIPAM, poly (N-isopropylacrylamide).

Scheme 3

-continued

R =

H-bond acceptor site ----→    ←---- H-bond donor site

The end-functionalized copolymer of formula I may be compounded into a rubber composition.

The rubber composition may optionally include, in addition to the functionalized polymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis 1,4 polybutadiene), polyisoprene (including cis 1,4 polyisoprene), butyl rubber, halobutyl rubber such as chlorobutyl rubber or bromobutyl rubber, styrene/isoprene/butadiene rubber, copolymers of 1,3 butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E SBR having a medium to relatively high bound styrene content, namely, a bound styrene content of about 30 to about 45 percent.

By emulsion polymerization prepared E-SBR, it is meant that styrene and 1,3 butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm3/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl)tetrasulfide.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

Reagents:
Dichloromethane (DCM), tetrahydrofuran (THF), methanol (MeOH), isopropanol, triethylamine (Et3N), n-Butyllithium (nBuLi), cyclohexane, maleic anhydride, tetra-n-butylammonium fluoride (TBAF), diisobutylaluminum hydride (DIBAL-H) were purchased commercially and used as received without any further distillation/purification treatment.

A thiol form of poly(N-isopropylacrylamide), PNIPAM-SH, was prepared following procedure described in copending Ser. No. 13/332,837. Instruments:
a) Nuclear Magnetic Resonance (NMR): $^1$H NMR and $^{13}$C NMR spectra were recorded on a Varian INOVA 400 MHz spectrometer. Chemical shifts are given in parts per million (ppm) either by using tetramethylsilane (TMS, δ=0.00) or the residual protic solvent peak (for CHCl$_3$, δ=7.26 and for CH$_2$Cl$_2$, δ=5.30) as a shift reference for $^1$H NMR spectra and CDCl$_3$ (δ=77.16) and CD$_2$Cl$_2$ (δ=53.80) as a shift reference for $^{13}$C NMR spectra.
b) Tensile Testing: Physical testing of the solution cast polymer films were done on a MTS Tensile Tester with 100 N load cell. Engineering strain rate of 10%/s was applied to each samples which corresponded to a displacement rate of 2.6 mm/s.
c) Gel Permeation Chromatography (GPC): GPC analysis was done using Agilent 1100 Series-LC with a Wyatt Technologies MiniDawn detector and Gilson 234 Auto sampler. THF was used as the mobile phase at a flow rate of 1.00 ml/min at a column temperature of 35° C. Astra 4.73.04 software was used for analysis of the chromatogram and determining calculated sample mass, molecular weight (Mw, Mn) and polydispersity (PDI=Mw/Mn).

Example 1

Synthesis of Hydroxyl End-Functionalized Polyisoprene (1) Via Chain-Termination Approach (Scheme 4)

A 4 oz. Boston round glass bottle was charged with isoprene (15% by weight in cyclohexane) (9.1 g monomer, 133 mmol) and the 1.6 M n-BuLi/hexane initiator (133 mmol) was added all at once and the bottle was placed in a polymerization bath pre-set at 65° C. The bottle was tumbled at that temperature for 2 hours. At the end of that time, the bottle was taken out of the polymerization bath and terminated using ethylene oxide gas. The polymer was purified by precipitating the cement in MeOH at room temperature. The precipitated polymer was then dried in vacuum oven. GPC analysis indicated the Mn of the polymer to be 6.8 kDa and a PDI of 1.03.

Hydroxyl-terminated polyisoprene of various molecular weights was produced following a similar procedure.

Example 2

Synthesis of Hydroxyl End-Functionalized Polyisoprene (1) Via Functional Initiator Approach (Scheme 1)

In this approach, the polymerization procedure was similar to Example 1 except for using the tert-butyldimethylsiloxypropyllithium (tBDMSPrLi) functional initiator. A 4 oz. Boston round glass bottle was charged with isoprene (15% by weight in cyclohexane) (9.1 g monomer, 133 mmol) and the 0.47 M tBDMSPrLi/cyclohexane initiator (2.06e-2 mmol) was added all at once and the bottle was placed in a polymerization bath pre-set at 65° C. The bottle was tumbled at that temperature for 2 hours. At the end of that time, the bottle was taken out of the polymerization bath and quenched with isopropanol. The polymer was purified by precipitating the cement in MeOH at room temperature under vigorous stirring. GPC analysis indicated the Mn of the polymer to be 458 kDa and a PDI of 1.04. $^1$H NMR analysis indicated the polymer contains the protected chain-end-groups. Characteristic $^1$H NMR resonances were observed: a singlet at ~δ 0.47 corresponding to the dimethyl groups and another singlet at ~δ 0.89 ppm corresponding to the tert-butyl group. The dried polymer was stored in a vial under nitrogen.

Deprotection of the polymer was done using 1M diisobutylaluminum hydride/hexane (DIBAL-H). The protected polymer (6 g, 1.31e-2 mmol) was dissolved in THF (120 mL)

and 5 molar equivalent (with respect to the moles of the protecting group) DIBAL-H (65 mg, 6.5e-2 mmol) was added all at once and the reaction mixture was stirred at room temperature for 12 hours. The de-protected polymer was then isolated by precipitation in MeOH.

$^1$H NMR analysis indicated the removal of the peaks characteristic to the dimetyl- and tert-butyl group indicating the removal of the TBDMS group.

Hydroxyl-end functionalized polyisoprene (PI-OH) of various molecular weights was produced as shown in Table 2. As seen in Table 2, use of the functional initiator approach followed by de-protection with DIBAL-H, de-protected PI-OH of molecular weights starting from as low as 5 kDa to as high as 450 kDa were synthesized. All the polymers had narrow poly dispersity index (PDI), consistent with efficient anionic polymerization.

TABLE 2

Synthesis of PI-OH

| PI-OH[a] | Mn GPC (kDa) | PDI |
|---|---|---|
| 1 | ~9 | 1.05 |
| 2 | ~22 | 1.03 |
| 3 | ~51 | 1.08 |
| 5 | ~87 | 1.01 |
| 6 | ~113 | 1.01 |
| 7 | ~280 | 1.01 |
| 8 | ~380 | 1.01 |
| 9 | ~458 | 1.04 |

[a]In all cases >95% yields were obtained

Example 3

The hydroxyl-end functionalized polyisoprene of Example 2 was converted to a maleimide terminated polyisoprene following the route in Scheme 5.

To a dichloromethane solution of the 450 kDa hydroxyl end-funtionalized PI of Example 2 (6 g, 1.31e-2 mmol), a dichloromethane solution of 5 equiv. maleimido acid-chloride (16 mg, 6.5e-2 mmol) was added. After stirring for 10 minutes, an excess of triethylamine was added and the reaction stirred overnight at room temperature. The polymer was purified by precipitation in MeOH and dried in vacuum oven at 30° C. for 24 hours.

Scheme 5

Maleimide end-functionalized polymer

Representative Maleimide end-functionalized polymer $^1$H NMR resonances indicated the complete disappearance of the peak at δ 3.63 (—CH$_2$—OH of starting material) and the formation of the product was confirmed by the appearance of a new peak at δ 4.2 corresponding to the —CH$_2$—O (CO)— of the newly formed ester bond.

The maleimido acid chloride was produced following the synthetic pathway as shown in Scheme 6.

Scheme 6

Example 4

The maleimide end-functionalized polyisoprene of Example 3 was converted to a PNIPAM end-functionalized polyisoprene.

To a 120 mL THF solution of the ~450 kDa maleimide end-functionalized PI of Example 3 (5 g, 1.11e-2 mmol) in a round-bottom flask was added a THF solution of five equiv.

PNIPAM-SH (277 mg, 5.6e-2 mmol). The PNIPAM-SH contained forty N-isopropylacrylamide repeat units. After stiffing for 10 minutes, a large excess of triethylamine was added and the reaction stirred for 5 minutes at room temperature. The polymer was purified by precipitation in methanol to remove the free PNIPAM-SH.

The $^1$H NMR resonances assigned to the maleimide protons at δ 6.9 ppm disappeared and a new set of peaks appeared at δ 2.8 ppm and δ 2.9 ppm for the PNIPAM-grafted maleimide. The reaction yield was quantitative and purification of the polymer was done by precipitation from methanol. Gel Permeation Chromatography (GPC) analysis was performed to confirm the quantitative removal of the unreacted PNIPAM-SH from the target polymer Example 5

Figure 1:
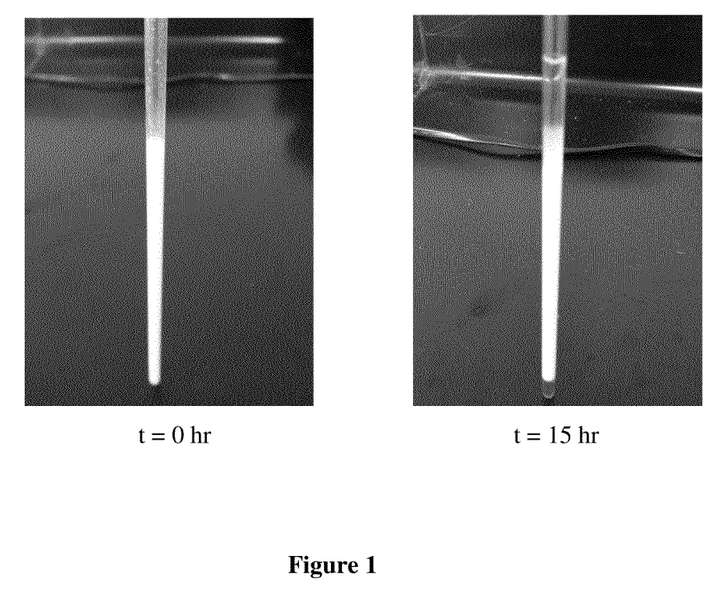
FIG. 1 is a representation showing an emulsion formed from an elastomer.

Emulsification of the PNIPAM end-functionalized elastomer of Example 4 was accomplished by shaking of a mixture of water, and chloroform solution. It resulted in an emulsion which remained stable for more than 12 hours (FIG. 1). In contrast, no stable emulsion formed when a) only the maleimido end-functionalized PI or b) only the PNIPAM-SH was attempted. The former sample formed an emulsion which was stable only for few minutes whereas the later sample did not form any emulsion at all.

Example 6

Tensile testing was done on the PNIPAM end-functionalized nanostructure-inducing polyisoprene of Example 4. A solution-based film of the end-functionalized nanostructure-inducing elastomer was casted and the solvent was allowed to evaporate completely. The tensile test data of this dry cast-film is shown in FIG. 2

Figure 2:
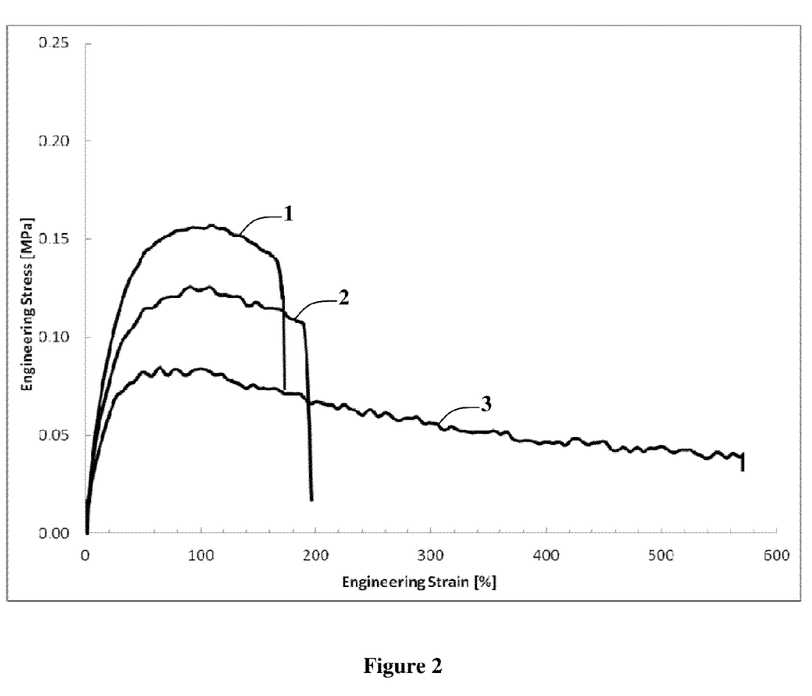
FIG. 2 is a graph of stress versus strain for various elastomers.

The control for comparison of the tensile strength was the 450 kDa hydroxyl end-functionalized (3 in FIG. 2). As can be seen from FIG. 2, the nanostructure-inducing polyisoprene (1 in FIG. 2) has a tensile strength significantly higher than the control unfunctionalized PI (3). It is also found to have higher tensile properties compared to ~1 MM very high-cis Neodymium-PI (2 in FIG. 2). The poor elongation-at-break of the nanostructure-inducing elastomer (1) was likely due to flaws developed in the film during drying of the solution-cast film. GPC of nanostructure-inducing elastomer (2) showed that the molecular weight is around ~455 kDa, indicating that no chemical cross-link occurred during the reaction. The absence of any chemical cross-link, coupled with the increase in tensile strength suggests the formation of the nanostructure in the end-functionalized polymer (2).

What is claimed is:

1. A copolymer comprising the structure

X—R—O—R'—S—Z    (I)

where X is a polymer derived from a monomer comprising at least one conjugated diene monomer and optionally at least one vinyl aromatic monomer;

S is sulfur;

Z is a polymer derived from a monomer having a hydrogen bond donor site and a hydrogen bond acceptor site;

R is a covalent bond or an alkyl group of 1 to 12 carbon atoms bonded to a terminal end of X;

O is oxygen; and

R' is a divalent organic group comprising a maleimido group linked to the S.

2. The copolymer of claim 1, wherein the at least one conjugated diene monomer is selected from the group consisting of isoprene and butadiene.

3. The copolymer of claim 1, wherein the vinyl aromatic monomer is styrene.

4. The copolymer of claim 1, wherein X is selected from the group consisting of solution polymerized styrene-butadiene rubber, emulsion polymerized styrene-butadiene rubber, polybutadiene, natural polyisoprene rubber, and synthetic polyisoprene rubber.

5. The copolymer of claim 1, wherein Z is derived from a monomer of formula where $R^6$ is selected from the group consisting of C2 to C6 linear alkyl, C2 to C6 branched alkyl, and C3 to C6 cycloalkyl.

6. The copolymer of claim 1, wherein Z is a poly(N-isopropylacrylamide).

7. The copolymer of claim 1, wherein the polymer Z has a weight average molecular weight ranging from about 500 to about 20000 g/gmol.

8. The copolymer of claim 1, comprising from about 1 to about 20 weight percent Z.

9. The copolymer of claim 1, wherein Z is of formula where $R^7$ is selected from the group consisting of C2 to C6 linear alkyl, C2 to C6 branched alkyl, and C3 to C6 cycloalkyl, and m is the degree of polymerization of the hydrocarbon chain.

* * * * *